April 21, 1942.　　　　E. SHOCKEY　　　　2,280,640
LIGHT REFLECTING AND DISTRIBUTING CEILING STRUCTURE
Filed Nov. 29, 1938　　　5 Sheets-Sheet 1

INVENTOR.
EDWARD SHOCKEY
BY
Richey & Watts
ATTORNEYS

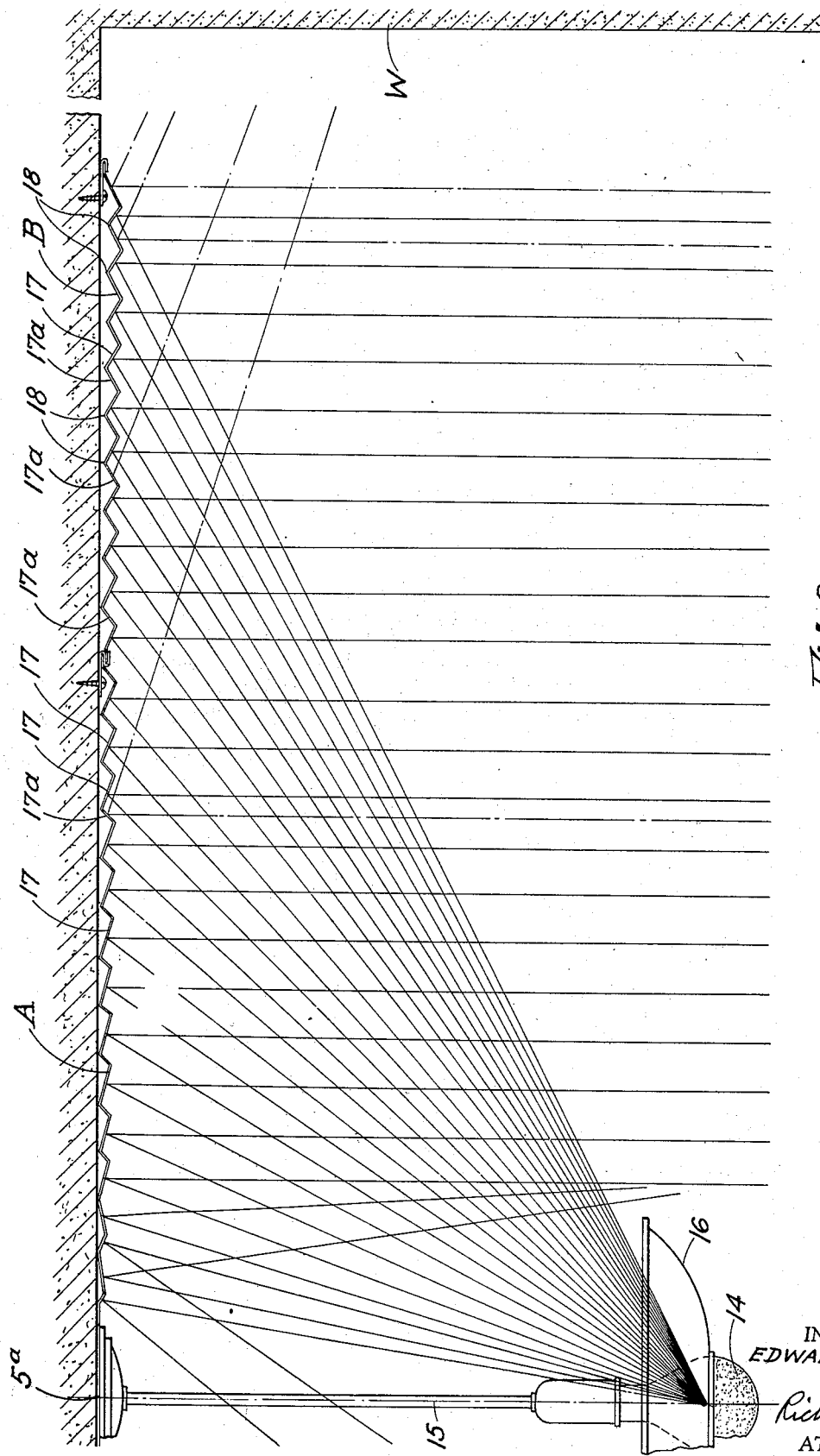

April 21, 1942.  E. SHOCKEY  2,280,640
LIGHT REFLECTING AND DISTRIBUTING CEILING STRUCTURE
Filed Nov. 29, 1938  5 Sheets-Sheet 3
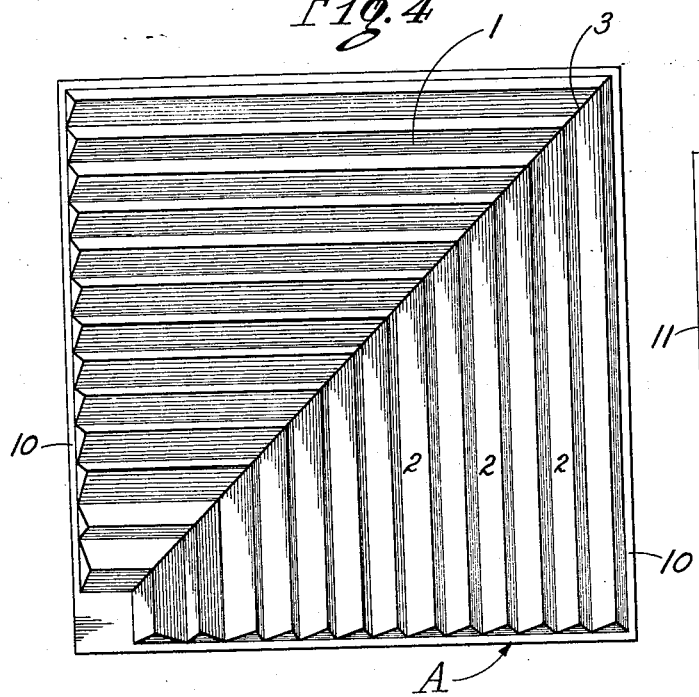
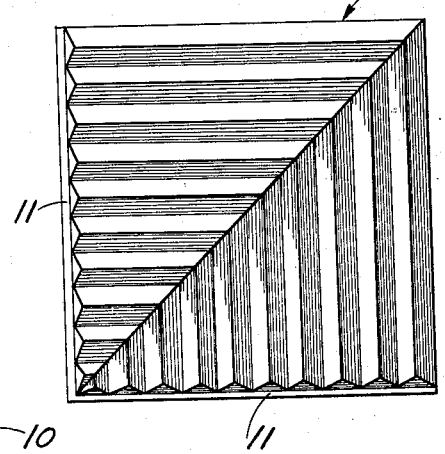
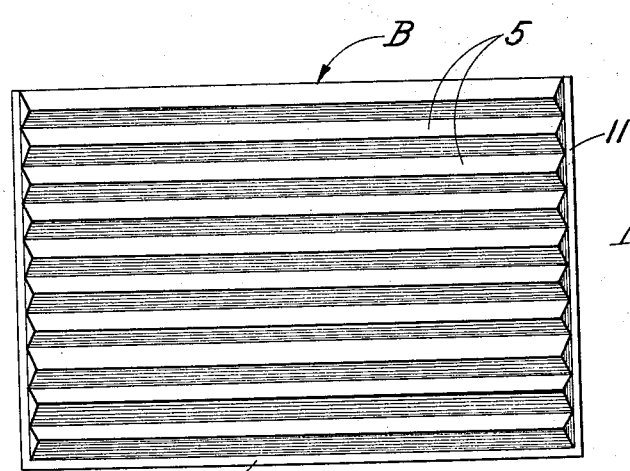
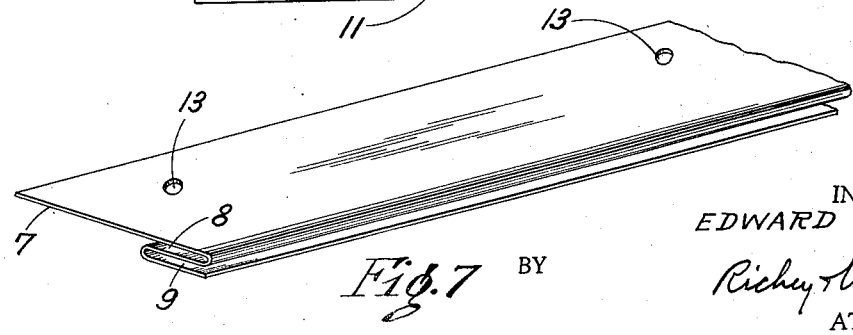
INVENTOR.
EDWARD SHOCKEY
BY Richey & Watts
ATTORNEYS April 21, 1942.  E. SHOCKEY  2,280,640

LIGHT REFLECTING AND DISTRIBUTING CEILING STRUCTURE

Filed Nov. 29, 1938  5 Sheets-Sheet 4

INVENTOR.
EDWARD SHOCKEY
BY
Richey & Watts
ATTORNEYS

April 21, 1942.　　　　　E. SHOCKEY　　　　　2,280,640
LIGHT REFLECTING AND DISTRIBUTING CEILING STRUCTURE
Filed Nov. 29, 1938　　　　　5 Sheets-Sheet 5

INVENTOR.
EDWARD SHOCKEY
BY
*Richey Watts*
ATTORNEYS

Patented Apr. 21, 1942

2,280,640

UNITED STATES PATENT OFFICE 2,280,640

LIGHT REFLECTING AND DISTRIBUTING CEILING STRUCTURE

Edward Shockey, Canton, Ohio, assignor to Republic Steel Corporation, Cleveland, Ohio, a corporation of New Jersey Application November 29, 1938, Serial No. 242,965

4 Claims. (Cl. 240—103)

This invention relates to the reflection and distribution of light and more particularly to an improved light reflecting ceiling construction.

One of the major problems of present day lighting, particularly for offices and other industrial applications, is to obtain an even and uniform distribution of light with a maximum illumination at the work level and without the creation of objectionable glare and reflection from the ceiling and wall surfaces. The ordinary flat ceiling surface, if painted white to give maximum reflection, produces such a brilliant ceiling illumination that distracting and injurious glare frequently results. Moreover, the intensity of the illumination at the work level is decreased by the absorption of light which is reflected by the ceiling to the side walls of the room. Indirect or semi-indirect illumination is particularly referred to in this application and it is with the solution of problems connected with indirect lighting that the present invention is particularly concerned.

It is among the objects of my invention to provide a light distributing ceiling which may be easily installed, which distributes the light from an indirect lighting unit evenly over the working area with a maximum intensity at any given level. Other objects of my invention are the provision of a light reflecting ceiling which will direct substantially all of the light from an indirect light source directly downwardly without striking the side walls of the room; the provision of a reflecting and distributing ceiling which will greatly reduce fatigue and eyestrain by maintaining the apparent ceiling brightness at a low value while giving a maximum illumination at the working level; the provision of light reflecting ceiling units which may readily be applied to cover either large or small ceiling areas and which may be completely prefabricated and readily installed in existing structures; the provision of a light reflecting ceiling which may be made in economically manufactured sheet metal units; the provision of a reflecting ceiling in which a minimum of different sizes and shapes of units are needed for covering various ceiling areas; the provision of a light reflecting ceiling with which high illumination can be comfortably supplied without the production of objectionable glare on either the walls or ceiling; the provision of a light reflecting ceiling for use with a plurality of light sources whereby light striking the ceiling area above each source will be reflected substantially vertically downwardly regardless of whether such light emanates from the source directly below said area or from an adjacent source; and the provision of a light reflecting ceiling whereby the output of a light source is efficiently utilized.

The above and other objects of my invention will appear from the following description of several embodiments thereof, reference being had to the accompanying drawings, in which—

Figure 3 is an enlarged illustrative view taken substantially on line 3—3 of Figure 1 and illustrating the arrangement of the light reflecting surfaces and the paths of the light rays emanating from an indirect light source and striking the reflecting areas or surfaces.

Figure 4 is an enlarged plan view of one of the four center panels shown in Figure 1.

Figure 5 is a view similar to Figure 4 but illustrating one of the eight outer panel units shown in Figure 1.

Figure 6 is a view similar to Figures 4 and 5 but illustrating one of the four outside corner reflecting units of Figure 1.

Figure 7 is a fragmentary detached perspective view of the binding and securing strips which are preferably employed to hold my panel units in position on the ceiling.

My invention, as used to distribute the light from a single light source such as an indirect luminaire suspended below the ceiling level, contemplates the formation, on the horizontal ceiling, of a plurality of relatively narrow elongated surfaces or areas, extending around the light source as a center, each surface being so inclined relative to the horizontal plane of the ceiling that light from the source which strikes any one of the surfaces will be reflected substantially vertically downwardly. The reflecting surfaces which extend around the light source are preferably in the form of ridges, or corrugations of somewhat prismoidal shape formed in a generally flat panel or surface unit and the back of each ridge comprises a reflecting surface disposed at such an angle that it will reflect light from an adjacent luminaire in a vertically downward path, as will be explained more fully later.

Figure 1:
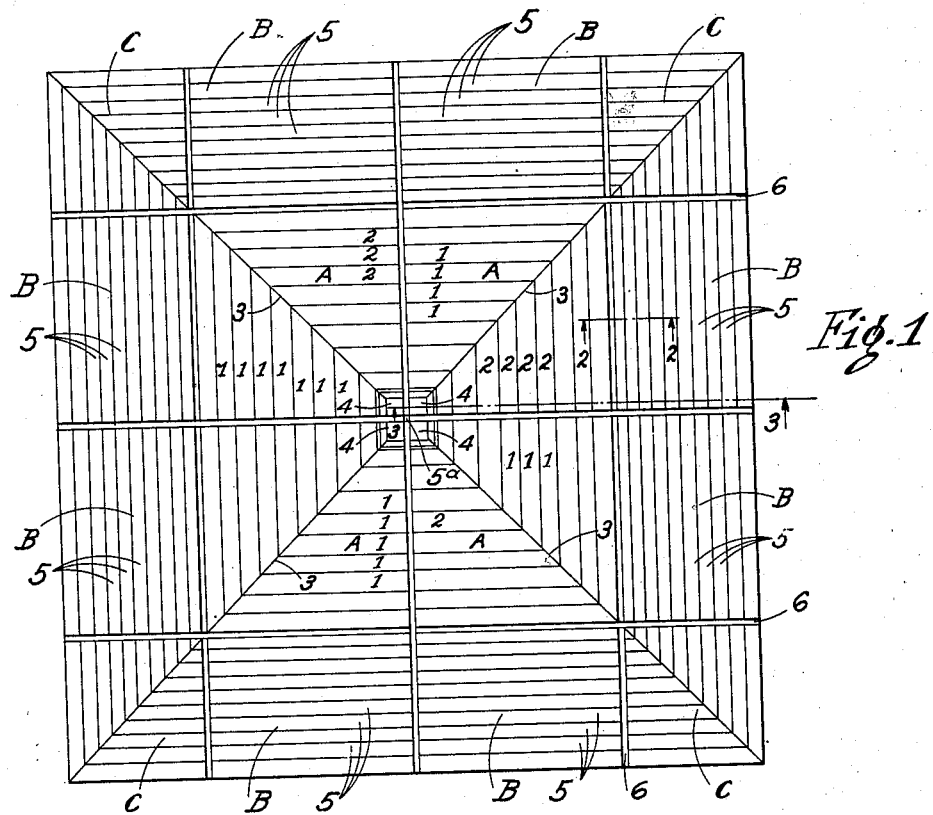
Figure 1 is a view looking upwardly at one form of my improved light reflecting and distributing ceiling.
Figure 2:
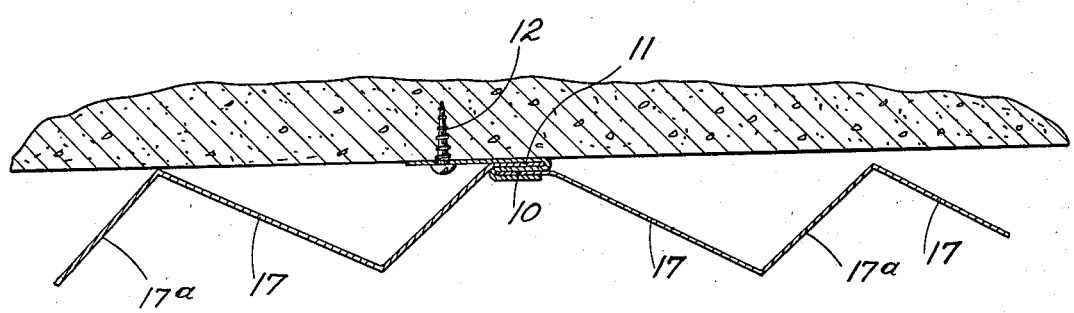
Figure 2 is an enlarged fragmentary cross-sectional view taken on line 2—2 of Figure 1 and illustrating a preferred means of securing the panel units in position on the ceiling.

Figure 1 illustrates my invention in a simple but very effective form. The reflecting ceiling shown in Figure 1 is made up of four rectangular generally flat central panels A which are positioned on the ceiling with adjacent sides abutting. Each of these units is formed with a plurality of reflecting surfaces 1 which extend parallel to each other and to one side of the unit, and a plurality of reflecting surfaces 2 which extend at right angles to the surfaces 1 and which meet the surfaces 1 on diagonal lines 3. Relatively small corner portions 4 of each panel A are preferably not grooved or corrugated and are disposed together to form a central area. The lighting unit or luminaire is suspended from the central point 5a of the ceiling assembly. In some cases the panels A, which may conveniently be made approximately 3 feet square, may be used alone to form a reflecting and distributing ceiling. However, where it is desired to cover a larger ceiling area, outer side panels B may be positioned outside of the panels A and the outer corner panels C located in the corners in the assembly. In the panels B the surfaces 5 all extend in the same direction while the reflecting surfaces of the corner panels C are arranged in the same manner as those of the central panels A. Supporting strips 6 (shown in detail in Figures 2 and 7) are preferably utilized to secure the panels in position on the ceiling. These supporting strips consist of a flat sheet metal body 7 having one edge thereof folded to provide vertically spaced slots 8 and 9 into which the flattened edges 10 and 11 of adjacent panels may be inserted. These strips 6 are secured to the ceiling as by screws 12 extending through spaced holes 13. It will be understood, of course, that my ceiling panels may be secured to the ceiling in any desirable manner but I have found that the supporting strips just described provide a simple and sightly means for holding the reflecting ceiling assembly in position. Where the term "generally flat" is used herein it is understood to mean that the panels or surface members which are composed of the corrugated reflecting areas are substantially flat in their general form as distinguished from curved corrugated lenses and reflectors which have previously been proposed. By providing a generally flat reflecting area or surface which directs light from a source in parallel rays, I provide a structure which can be applied to an existing ceiling without interfering with the normal head room or appearance of the room.

Referring particularly to Figure 3, a light source comprising a lamp bulb 14, having its lower half silvered to form a reflecting surface, is supported from the central point 5 of the ceiling surface by a suitable supporting member 15. An indirect light reflecting bowl or reflector 16 of any suitable type is provided to direct the light from the source against the ceiling and prevent direct rays from striking the side walls. In Figure 3 the light lines indicate the paths of rays of light from the source 14 which strike the various reflecting surfaces of the ceiling. It will be seen that all of the light which strikes the ceiling is reflected substantially vertically downwardly except that which strikes the ceiling immediately above the bowl 16. This central light is reflected slightly outwardly in order to prevent it from being reflected back into the bowl with resulting light loss. The light reflecting areas 17 (Fig. 2) are the same as those referred to by the numerals 1, 2 or 5 in the discussion of Figure 1. Each of these areas comprises an elongated, relatively narrow surface which is disposed at an angle to the normal horizontal plane of the ceiling to which my reflecting surface is attached. As will be seen from Figure 3, the angle of the light reflecting surfaces 17 to the horizontal plane of the ceiling increases progressively as the outer edge of the ceiling reflecting surface is approached. In other words, the surfaces 17 which are close to the center 5a have a very slight angle to the horizontal and, as is seen in Figure 3, light striking these surfaces from the source 14 will be reflected substantially vertically downwardly. The reflecting areas or surfaces 17 which are disposed adjacent the outer edge of the entire reflecting area are disposed at a greater angle to the ceiling. These angles are so arranged and are increased in such progressive relation that substantially all light from the source 14 will be reflected substantially vertically downwardly and substantially no direct light will be reflected from my ceiling surface structure against the side walls W of the room.

The center panels A are provided with flanges 11 extending entirely around their peripheries. These flanges 11 lie in a single plane and the apex at the top edge of each of the reflecting surfaces of the units A preferably lies in substantially the same plane. In the panels B and C, however, as will be seen from Figure 3, the top edges or apexes 18 of at least a portion of the reflecting surfaces are spaced from the plane of the outer edges of the panels. This arrangement is desirable in that it eliminates the necessity for excessively deep grooves or corrugations in the sheet metal panels and also, when in use, gives the appearance of a substantially arched or curved ceiling although, in fact, the departure from the horizontal may be very slight. By making the reflecting areas 17 narrow, for example 2" or 3" in width, and increasing the angle of each adjacent area only very slightly, a very even and uniform direction of light in a vertically downwardly direction is obtained.

As is seen in Figures 5 and 6 the edge flanges may be omitted from the outer edges of the panels B and C. It will be understood that this omission is for purposes of appearance and that, if it is desired to support the outer edges of the panels B and C, flanges may be formed thereon, as is shown in Figure 3.

Figure 8:
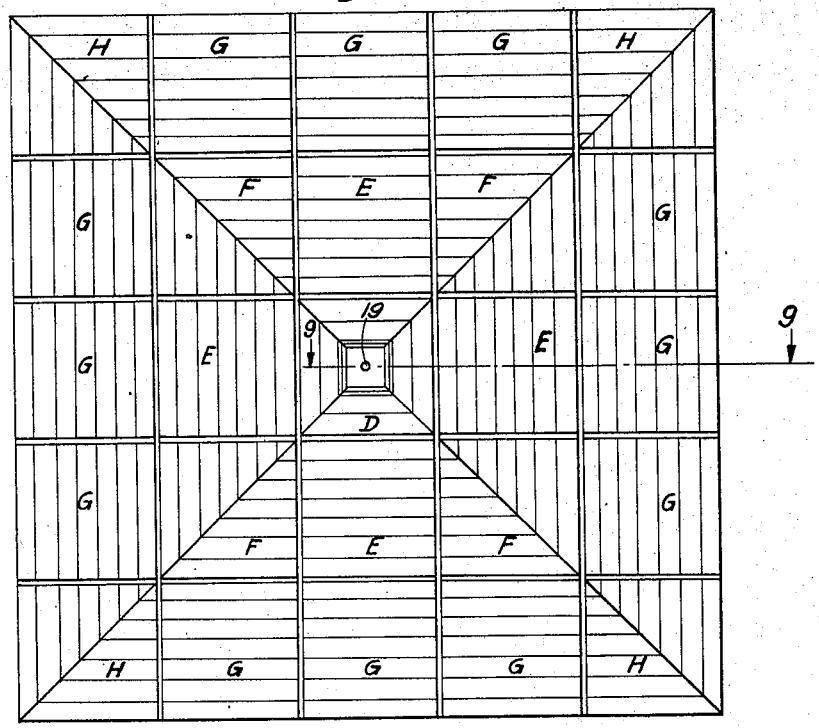
Figure 8 is a view similar to Figure 1 but illustrating a modified arrangement of panel units.
Figure 9:
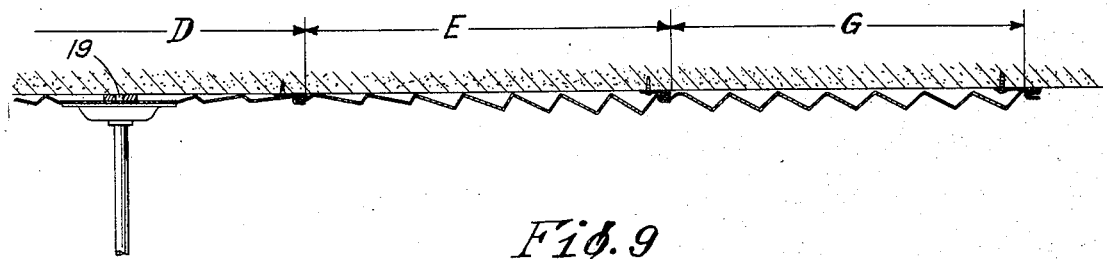
Figure 9 is an enlarged vertical cross-sectional view taken on line 9—9 of Figure 8.

In Figure 8 a rectangular central panel D is surrounded by four outer panels E and four corner panels F. These in turn are surrounded by another set of outer panels G and corner panels H. The stepped reflecting areas in this ceiling structure all extend in rectangular arrangement around the center 19 and, as seen in Figure 9, the angles of the reflecting surfaces are so arranged that light from a source located a predetermined distance below the center 19 will substantially all be reflected straight down to the working level without striking the walls of the room.

Figure 10:
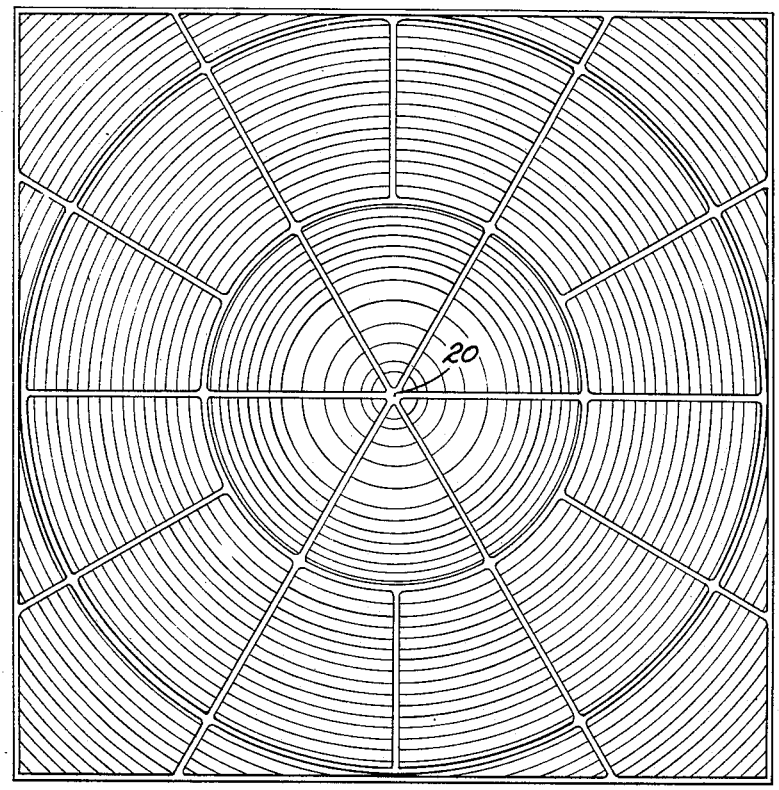
Figure 10 is a view similar to Figures 1 and 8 but illustrating a modified ceiling in which the light reflecting surfaces are curved and extend in concentric circles around the center.
Figure 11:
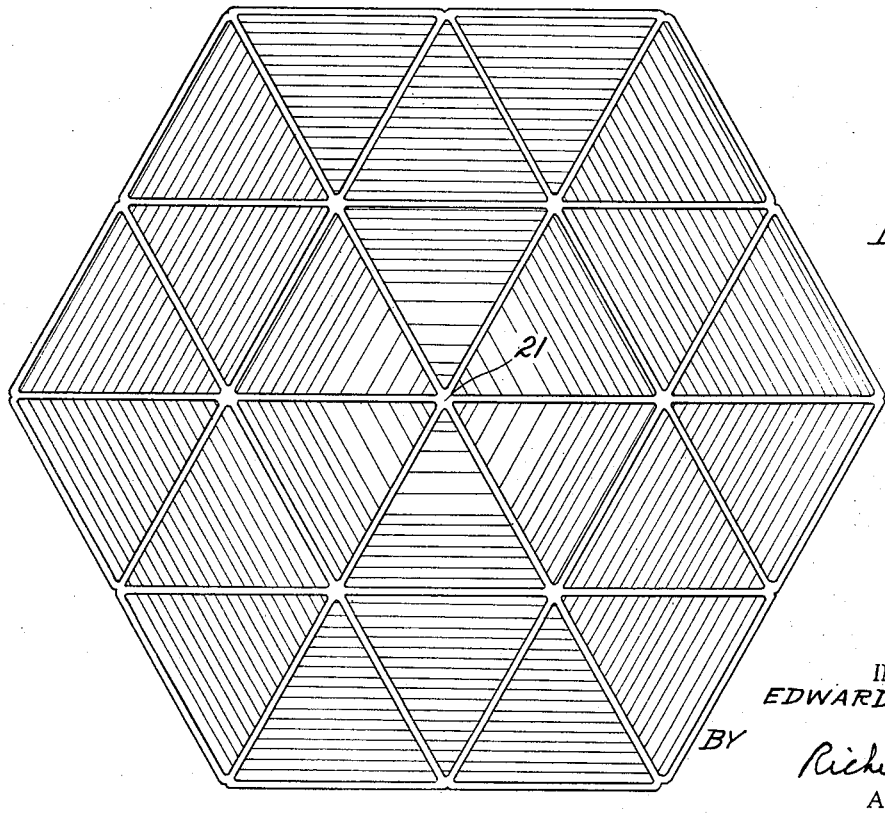
Figure 11 is another modification in which triangular panel units are arranged in hexagonal form to provide a light reflecting and distributing ceiling surface.

Figures 10 and 11 are self explanatory, the panels in Figure 10 being so formed that the light reflecting areas extend around the center 20 in concentric circles while in Figure 11 they extend around the center 21 in hexagonal arrangement. Various other decorative plans may be utilized for arranging my long and narrow light reflecting surfaces relative to a center point below which the light source is suspended. Of course, in all such embodiments the light reflecting areas or surfaces will be so disposed relative to the horizontal plane of the ceiling that light from the source which strikes any particular reflecting area will be directed substantially vertically downwardly.

In the illumination of large rooms it is frequently necessary to provide a number of lighting units, or luminaires. These may be arranged in regularly spaced rows, each light being centered below one of my reflecting and distributing areas of the proper size. As is seen best in Figure 3, the back surfaces 17ª of the reflecting steps of my ceiling are also disposed at an angle to the horizontal ceiling. These angles become progressively greater as the center 5ª of the panel is approached and are such that light emanating from an adjacent luminaire and striking the areas 17ª will be reflected substantially vertically downward. In Figure 3 the dot and dash lines represent light from such an adjacent light source and it will be understood that the surfaces 17ª on all sides of each reflecting area will direct light from adjacent light sources in the same manner. Thus, the overall efficiency of such multiple light and multiple reflecting area installations is increased.

I have found that by applying to my reflecting units an off-white coating, such as that given by aluminum paint, I am able to reduce the apparent brightness of the reflecting ceiling, depending upon the angle of view, from ½ to ⅕ of the apparent brightness of a flat white ceiling under the same lighting conditions. Thus, ceiling glare which is often a source of eyestrain and fatigue is greatly reduced, particularly where high illumination values are used. Tests made on my stepped reflecting ceiling covered with aluminum paint having a 70% reflection factor show that my ceiling will reflect approximately 11% more light than a flat white ceiling having a reflection factor of 80%. In other words, using a poorer reflecting surface, i. e., aluminum paint as compared to white paint, I obtain a greater total light output from the same light source. Moreover, when the light intensity is measured over a horizontal seeing plane or work level below the ceiling and which is equal in area to the ceiling, tests show that my ceiling will produce an average increase in illumination of 60% measured in foot candles, as compared with the illumination obtained over the same area from the same light source with a flat ceiling painted white. In these tests the reflection factor of my ceiling, painted with aluminum paint, was 71% while the reflection factor of the flat white ceiling was 85% and the measurements were taken 8 feet below the ceiling. Similar measurements taken 10 feet below the ceiling show that my ceiling produces an average increase in illumination of 72% at this work level. I attribute this to my control of the reflected light whereby diffusion of light against the walls and absorption thereby is prevented.

Although I have illustrated and described several embodiments of my invention in considerable detail it will be seen by those skilled in the art that various modifications and variations may be made in the structure and form of my reflecting and distributing ceiling without departing from the spirit of my invention. I do not, therefore, wish to be limited to the specific features herein shown and described, but claim as my invention all embodiments thereof coming within the scope of the appended claims.

I claim:

1. In combination, a ceiling, a plurality of spaced light sources each adapted to emit non-parallel light rays supported below said ceiling, a plurality of generally flat light reflecting and distributing surfaces on said ceiling, said surfaces being so disposed that one of said light sources is directly below the center of each of said generally flat reflecting and distributing surfaces, and each of said surfaces having angularly disposed reflecting areas extending around its center in straight lines, some of said areas being positioned to direct light from the directly below source in a substantially vertically downwardly direction and others of said areas being positioned to direct light from adjacent light sources substantially vertically downwardly.

2. In combination, a ceiling having thereon a plurality of generally flat light reflecting and distributing surfaces and a light source adapted to emit non-parallel light rays supported below the center of each of said surfaces, each of said generally flat surfaces comprising a plurality of elongated light reflecting areas extending in straight lines around the center of the surface, certain of said areas being disposed at progressively increasing angles to the plane of the ceiling from the center outwardly whereby light striking said areas from the light source below the center of the reflecting surface will be reflected substantially vertically downwardly, and certain other of said areas being disposed at progressively decreasing angles to the plane of the ceiling from the center outwardly whereby light striking said other areas from adjacent light sources will be reflected substantially vertically downwardly.

3. A ceiling reflector comprising corrugated sheet metal to be attached to a ceiling and to lie in a shallow plane substantially parallel to the ceiling, said corrugations including sides which have elemental reflecting surfaces, which are rectilinear in one direction and which intersect to form angular crests having included angles greater than 90°, one series of the sides of said corrugations being inclined in the same direction, and respectively at such acute angles to the plane of said ceiling that the reflecting surfaces thereof will intercept light rays from a light source in a plane lower than the plane of the ceiling and will reflect said intercepted rays downwardly in substantially parallel lines, the other series of sides of said corrugations being so inclined to the plane of the ceiling as not to intercept rays from said light source but to intercept rays from a second light source below the plane of the ceiling and laterally of the first light source, the reflecting surface of said second series of sides being inclined respectively at such acute angles to the plane of the ceiling as to reflect rays which they intercept downwardly substantially parallel to each other and to the rays reflected by the first said series of sides.

4. A reflector substantially as described in claim 3 in which the first said series of reflecting surfaces are arranged about a point above the said first light source and the said second series of reflecting surfaces are arranged about a point above the second said light source.

EDWARD SHOCKEY.